(12) United States Patent
Fleischman et al.

(10) Patent No.: US 11,567,554 B2
(45) Date of Patent: *Jan. 31, 2023

(54) CLOCK MESH-BASED POWER CONSERVATION IN A COPROCESSOR BASED ON IN-FLIGHT INSTRUCTION CHARACTERISTICS

(71) Applicant: ADVANCED MICRO DEVICES, INC., Santa Clara, CA (US)

(72) Inventors: Jay Fleischman, Fort Collins, CO (US); Michael Estlick, Fort Collins, CO (US); Michael Christopher Sedmak, Fort Collins, CO (US); Erik Swanson, Fort Collins, CO (US); Sneha V. Desai, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 15/837,918

(22) Filed: Dec. 11, 2017

(65) Prior Publication Data
US 2019/0179396 A1    Jun. 13, 2019

(51) Int. Cl.
*G06F 1/32*    (2019.01)
*G06F 1/324*    (2019.01)
(Continued)

(52) U.S. Cl.
CPC ............ *G06F 1/324* (2013.01); *G06F 9/3012* (2013.01); *G06F 9/30018* (2013.01); *G06F 9/3867* (2013.01); *G06F 13/38* (2013.01)

(58) Field of Classification Search
None
See application file for complete search history.

(56) References Cited

U.S. PATENT DOCUMENTS

| 5,511,181 | A |   | 4/1996 | Baxter |
| 5,604,912 | A | * | 2/1997 | Iadonato ............... G06F 9/3885 712/23 |

(Continued)

OTHER PUBLICATIONS

Kondo et al., "A Small, Fast and Low-Power Register File by Bit-Partitioning", 2005, IEEE, Proceedings of the 11th Int'l Symposium on High-Performance Computer Architecture (Year: 2005).*

(Continued)

*Primary Examiner* — Danny Chan

(57) ABSTRACT

A pipeline includes a first portion configured to process a first subset of bits of an instruction and a second portion configured to process a second subset of the bits of the instruction. A first clock mesh is configured to provide a first clock signal to the first portion of the pipeline. A second clock mesh is configured to provide a second clock signal to the second portion of the pipeline. The first and second clock meshes selectively provide the first and second clock signals based on characteristics of in-flight instructions that have been dispatched to the pipeline but not yet retired. In some cases, a physical register file is configured to store values of bits representative of instructions. Only the first subset is stored in the physical register file in response to the value of the zero high bit indicating that the second subset is equal to zero.

20 Claims, 6 Drawing Sheets

(51) Int. Cl.
  *G06F 9/38* (2018.01)
  *G06F 13/38* (2006.01)
  *G06F 9/30* (2018.01)

(56) References Cited

U.S. PATENT DOCUMENTS

| | | | | |
|---|---|---|---|---|
| 5,748,515 | A * | 5/1998 | Glass | G06F 9/30014 |
| | | | | 708/518 |
| 5,903,772 | A * | 5/1999 | White | G06F 9/3857 |
| | | | | 712/33 |
| 6,101,621 | A | 8/2000 | Kondo | |
| 6,343,356 | B1 * | 1/2002 | Pechanek | G06F 9/30036 |
| | | | | 711/173 |
| 6,463,525 | B1 * | 10/2002 | Prabhu | G06F 9/30014 |
| | | | | 708/513 |
| 6,609,209 | B1 * | 8/2003 | Tiwari | G06F 1/3228 |
| | | | | 713/322 |
| 7,209,482 | B1 * | 4/2007 | Rahim | H04L 47/10 |
| | | | | 370/230 |
| 9,389,833 | B2 * | 7/2016 | Pawlowski | G06F 7/02 |
| 2009/0177870 | A1 | 7/2009 | Fleisher | |
| 2013/0007415 | A1 | 1/2013 | Babayan et al. | |
| 2013/0290681 | A1 * | 10/2013 | Keller | G06F 9/384 |
| | | | | 712/210 |
| 2014/0129804 | A1 * | 5/2014 | King | G06F 9/30109 |
| | | | | 712/30 |
| 2014/0229710 | A1 * | 8/2014 | Muff | G06F 9/3836 |
| | | | | 712/205 |
| 2015/0010124 | A1 * | 1/2015 | Gupta | H03K 23/40 |
| | | | | 377/118 |
| 2016/0092221 | A1 * | 3/2016 | Stempel | G06F 9/30072 |
| | | | | 712/239 |
| 2016/0342192 | A1 * | 11/2016 | Shearer | G06F 1/3237 |
| 2017/0221550 | A1 * | 8/2017 | Diril | G11C 11/419 |
| 2018/0129475 | A1 * | 5/2018 | Almagambetov | G06F 7/525 |
| 2018/0165199 | A1 | 6/2018 | Brandt et al. | |
| 2018/0321938 | A1 * | 11/2018 | Boswell | G06F 9/30014 |
| 2019/0101952 | A1 * | 4/2019 | Diamond | G06F 1/08 |
| 2019/0227807 | A1 * | 7/2019 | Martin | G06F 7/50 |

OTHER PUBLICATIONS

U.S. Appl. No. 15/837,974, filed Dec. 11, 2017 in the name of Jay Fleischman et al., 29 pages.
Non-Final Office Action dated Dec. 2, 2019 for U.S. Appl. No. 15/837,974, 29 pages.
Non-Final Office Action dated Apr. 3, 2020 for U.S. Appl. No. 15/837,974, 22 pages.
Final Office Action dated Apr. 2, 2021 for U.S. Application No. 15,837,974, 17 pages.

* cited by examiner

CLOCK MESH-BASED POWER CONSERVATION IN A COPROCESSOR BASED ON IN-FLIGHT INSTRUCTION CHARACTERISTICS

BACKGROUND

Processing systems often include coprocessors such as floating-point units (FPUs) to supplement the functions of a primary processor such as a central processing unit (CPU). For example, an FPU executes mathematical operations such as addition, subtraction, multiplication, division, other floating-point instructions including transcendental operations, bitwise operations, and the like. A conventional instruction set architecture for coprocessors supports instructions that have a width of 128 bits. Some processing systems support extensions to the instruction set architecture that support an instruction width of 256 bits. For example, the AVX/AVX2 instruction set operates on registers that are 256 bits wide, which are referred to as YMM registers. Physical constraints make it difficult to pick and control all 256 bits in the same cycle. For example, the area needed to provide additional data paths for the 256 bits increases signal propagation delays, while higher-speed designs provide less cycle time to convey the signals.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
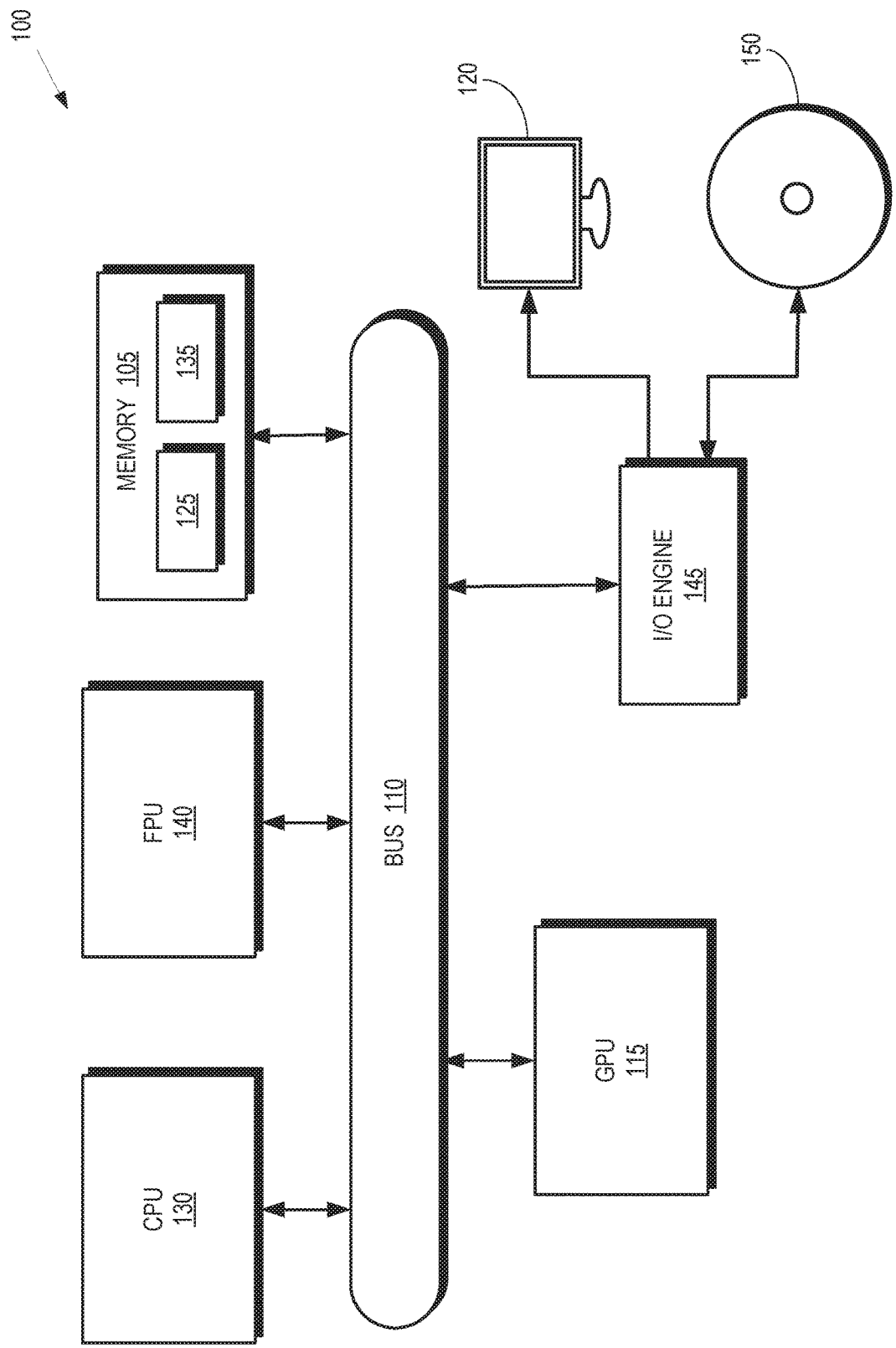
FIG. 1 is a block diagram of a processing system according to some embodiments.

A coprocessor that supports native 256 bit instructions is frequently called upon to execute instructions that only utilize 128 bits of the 256 available bits, such as instructions from legacy 128 bit instruction set architectures. Providing a clock signal to all 256 lanes of a pipeline in the coprocessor for instructions that only use 128 bits unnecessarily consumes power to provide a clock signal to the 128 unused lanes of the pipeline. Separate clock meshes therefore provide clock signaling to subsets of the lanes, e.g., a first clock mesh can provide clock signaling to the lanes that process the low 128 bits of the instruction and a second clock mesh can provide clock signaling to the high 128 bits of the instruction. In some embodiments, a scheduler dispatches the low 128 bits of the instruction to lanes of the pipeline that are physically closer to a controller that provides control signals for the instruction and the scheduler dispatches the high 128 bits of the instruction to lanes that are physically more distant from the controller. Additional clock meshes can also be provided to support additional subsets of lanes. A third clock mesh (which is always on) is used to provide clock signaling for control signals in the coprocessor. The first and second clock meshes are selectively turned on or off based on characteristics of in-flight instructions, which are defined as instructions that have been dispatched but not yet retired. In some embodiments, one bit per entry in a retirement queue indicates whether the corresponding instruction uses 128 bits or 256 bits. If none of the entries in the retirement queue utilize the high 128 bits, which indicates that there are no in-flight instructions that use the high 128 bits, the second clock mesh is turned off. If there are no coprocessor entries in the retirement queue, which indicates that there are no in-flight instructions in the coprocessor, the first clock mesh is also turned off.

Instructions that do not use the high 128 bits are conventionally represented using the low 128 bits and zero values in the high 128 bits. This representation of the instruction requires that the zeros in the high 128 bits be written to a physical register file in the coprocessor and subsequently read from the physical register file when the instruction is executed in the pipeline. The extra 128 reads/writes of zeros unnecessarily consume additional power. To address this problem, some embodiments of the coprocessor associate each instruction with a "zero high" bit. The coprocessor sets the zero high bit for 128 bit instructions to a predetermined value (such as 1 or logical high) to indicate that all the high 128 bits are set to zero. The value of the zero high bit therefore tells the scheduler that it can set the high 128 bits to zero and it is not necessary to read these bits from the physical register file. Only the low 128 bits are loaded into the physical register file. If different clock meshes are implemented to provide clock signals to the high 128 bits and the low 128 bits, the clock mesh that provides clock signals to the high 128 bits are turned off if the zero high bits for all the in-flight operations have been set to the value that indicates that the high 128 bits are zero.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, in some cases, the memory 105 is implemented using other types of memory including static random access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 renders objects to produce values of pixels that are provided to the display 120, which uses the pixel values to display an image that represents the rendered objects. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 executes instructions such as program code 135 stored in the memory 105 and the CPU 130 stores information in the memory 105 such as the results of the executed instructions. The CPU 130 is also able to initiate graphics processing by issuing draw calls to the GPU 115.

The processing system 100 also includes one or more co-processing units such as a floating-point unit (FPU) 140 that is configured to carry out operations on floating point numbers. Some embodiments of the FPU 140 perform operations including addition, subtraction, multiplication, division, square root, and bit shifting or broadcasting, as well as transcendental functions such as exponential functions, trigonometric functions, and the like. The FPU 140 supports operation of the GPU 115 and the CPU 130. For example, if the CPU 130 encounters an instruction that requires performing a floating-point operation, the CPU 130 transmits a request to the FPU 140, which carries out the operation and returns the results to the CPU 130. Although the FPU 140 shown in FIG. 1 is implemented externally to the GPU 115 and the CPU 130, some embodiments of the FPU 140 are integrated into one or more other processing units.

The FPU 140 is configured to operate on instructions that include a relatively large number of bits, e.g., on 256 bit instructions. The physical devices (such as transistors) that are used to implement lanes of one or more pipelines that process the instructions in the FPU 140 are therefore distributed over a relatively large area. The lines or traces that are used to convey control signaling to the lanes of the pipelines introduce propagation delays that differ significantly between different lanes of the pipelines. For example, a propagation delay between a lane that is disposed relatively close to the controller is shorter than a propagation delay between a lane that is disposed relatively far from the controller. The difference in propagation delays is one cycle or longer, depending on the number of bits in the instruction and the corresponding number of lanes in the pipelines.

The pipelines in the FPU 140 are therefore subdivided into multiple portions based on a physical distance between the portions and a controller. In some embodiments, the pipelines are each partitioned into a first portion and a second portion. For example, in a 256 bit instruction processor, the first portion handles a lower 128 bits of the instruction and the second portion handles the upper 128 bits of the instruction. A controller in the FPU 140 is configured to provide control signals to the first portion and the second portion of the pipelines. A first physical distance traversed by control signals propagating from the controller to the first portion is shorter than a second physical distance traversed by control signals propagating from the controller to the second portion. A scheduler in the FPU 140 is configured to provide a first subset of bits of the instruction to the first portion at a first time and a second subset of the bits of the instruction to the second portion at a second time subsequent to the first time. Some embodiments of the scheduler delay provision of the second subset of the bits to the second portion by one cycle of execution of the pipelines.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 is able to communicate with the memory 105, the GPU 115, or the CPU 130. In the illustrated embodiment, the I/O engine 145 is configured to read information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

Figure 2:
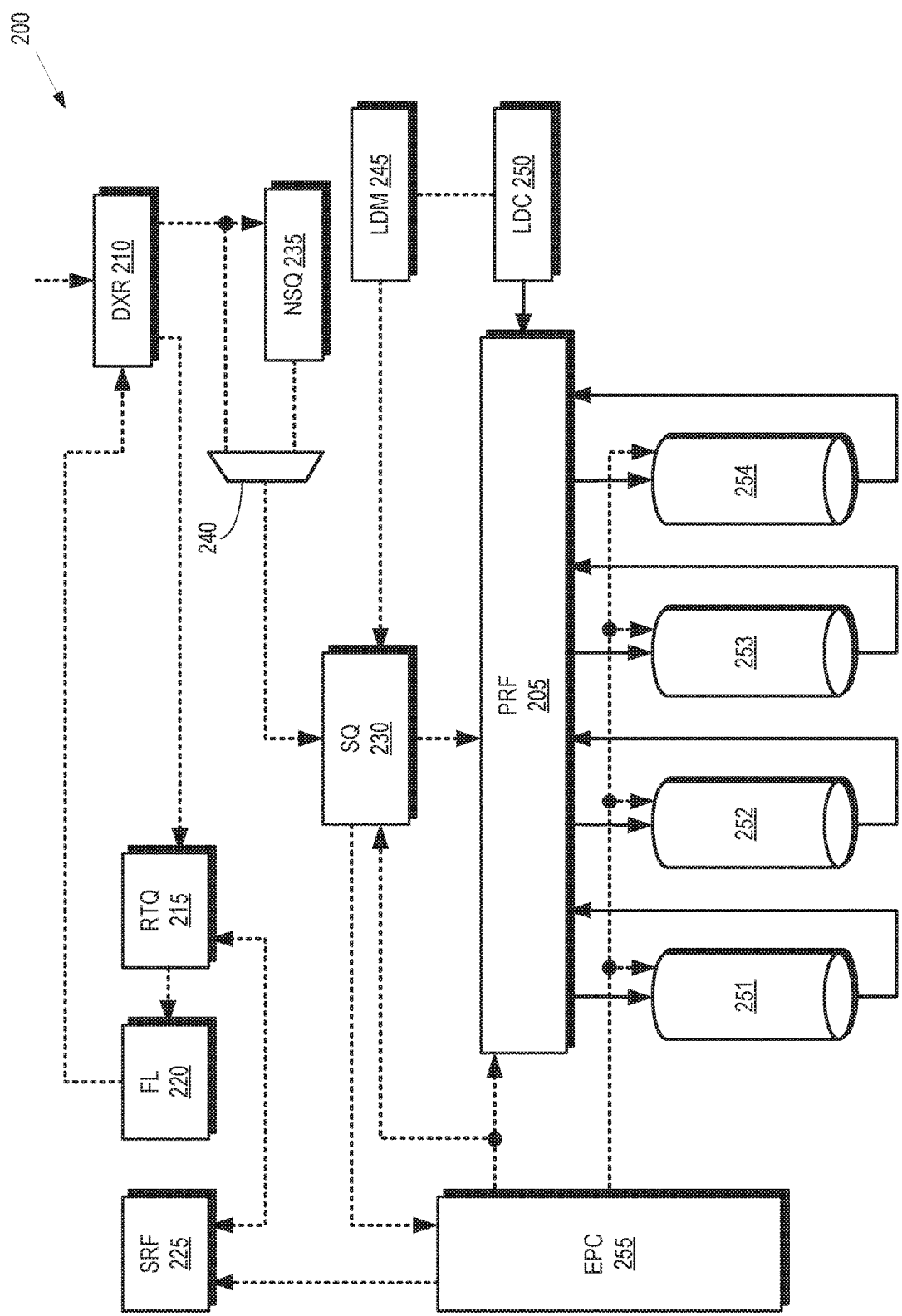
FIG. 2 is a block diagram of a floating-point unit (FPU) according to some embodiments.

FIG. 2 is a block diagram of an FPU 200 according to some embodiments. The FPU 200 is used to implement some embodiments of the FPU 140 shown in FIG. 1. The FPU 200 includes a set of physical register files 205 that are used to store instructions, operands used by the instructions, and results of executed instructions. Entries in the physical register files 205 are indicated by physical register numbers. In some embodiments, the physical register numbers are mapped (or renamed) to architectural register numbers that are defined by an instruction set architecture.

A decode, translate, rename block (DXR) 210 receives instructions that are to be executed by the FPU 200. The DXR 210 is configured to decode the instructions, perform address translations, and perform register renaming for instructions, as necessary. The DXR 210 is also connected to a retire queue (RTQ) 215 that stores instructions until they are retired. Writing the result of an instruction back to the physical register file 205 is referred to as retiring the instruction. A free list (FL) 220 maintains a list of free numbers of available registers in the physical register file 205, e.g., physical register numbers that are freed by retirement of instructions. A status register file (SRF) 225 includes information indicating the status of registers.

A scheduler (SQ) 230 is configured to schedule instructions for execution in the FPU 200. The DXR 210 provides decoded instructions to the scheduler 230. The DXR 210 is also connected to a non-pick scheduler queue (NSQ) 235 that queues instructions prior to being picked for execution by the scheduler 230. The NSQ 235 provides the queued instructions to the scheduler 230 for dispatch and execution. A multiplexer 240 is used to select between instructions provided by the DXR 210 and the NSQ 235. A load map block (LDM) 245 and a load convert block (LDC) 250 are used to load operands from memory or cache into the physical register file 205. The scheduler 230 stores pending instructions until their operands are available in the physical register file 205, e.g., until the load map block 245 the load convert block 250 have provided the necessary operands to the physical register file 205.

The FPU 200 implements four pipelines 251, 252, 253, 254 (collectively referred to herein as "the pipelines 251-254") that are configured to execute floating-point instructions that the scheduler 230 dispatches from the physical register 205 to the pipeline. For example, the pipelines 251-254 are each able to execute a 256 bit floating-point instruction that is received from the physical register file 205. Results of the instructions that are executed by the pipelines 251-254 are returned to the physical register file 205. The pipelines 251-254 process instructions in multiple stages (not shown in the interest of clarity) that include reading instructions, decoding instructions, executing instructions, and writing of results back to the physical register file 205.

A controller (EPC) 255 provides control signaling for exception and pipe control. Control signaling paths (e.g., as implemented using control buses) in FIG. 2 are indicated by dotted lines and data paths are indicated by solid lines. The controller 255 is disposed further from some lanes of the pipelines 251-254 than from other lanes of the pipelines 251-254. For example, the controller 255 is disposed closer to lanes of the pipeline 251 that are used to process the lower 128 bits of a 256 bit instruction and further from lanes of the pipeline 251 that are used to process the upper 128 bits of the 256 bit instruction. Consequently, control signals generated by the controller 255 take less time to propagate from the controller 255 to closer lanes of the pipelines 251-254 (e.g., those that process the lower 128 bits) and more time to propagate from the controller 255 to more distant lanes of the pipelines 251-254 (e.g. those that process the upper 128 bits).

In order to compensate for the additional propagation time required for control signals to reach more distant lanes of the pipelines 251-254, the scheduler 230 is configured to insert a delay between the dispatch times for different portions of instructions that are scheduled for execution on the pipelines 251-254. The delays between the portions of the instructions are determined based on propagation times between the controller 255 and different portions of the pipelines 251-254. Subsets of the bits of an instruction that are to be processed by lanes that are closer to the controller 255 are scheduled and dispatched to the pipelines 251-254 before subsets of the bits of the instruction that are to be processed by lanes that are further from the controller 255. Some embodiments of the scheduler 230 schedule a first subset of bits of an instruction for dispatch to a first portion of the lanes of the pipelines 251-254 at a first time and a second subset of the bits of the instruction to a second portion of the lanes of the pipelines 251-254 at a second time subsequent to the first time. For example, the scheduler 230 schedules the lower 128 bits of an instruction for dispatch to the pipeline 251 during a first cycle and schedules the upper 128 bits of the instruction for dispatch to the pipeline 251 during a second cycle that is the next cycle after the first cycle. The one cycle delay between dispatch of the upper 128 bits and the lower 128 bits allows the corresponding control signaling to reach the lanes that process the subsets of the bits.

Different clock meshes are used to provide clock signals to different portions of the pipelines 251-254, as well as other entities in the FPU 200 such as the scheduler 230 and the controller 255. Some embodiments of the FPU 200 include a first clock mesh that is configured to provide a first clock signal to the first portion of the pipelines 251-254 and a second clock mesh that is configured to provide a second clock signal to the second portion of the pipelines 251-254. The first and second clock meshes selectively provide the first and second clock signals based on characteristics of in-flight instructions that have been dispatched to the pipeline but not yet retired. Entries in the retirement queue 215 are used to determine the characteristics of the in-flight instructions, as discussed below. In some embodiments, the physical register file 205 is configured to store less than all of the bits that are used to represent the instructions. For example, only the lower bits are stored in the physical register file 205 in response to a value of a zero high bit indicating that the upper bits of the instruction are all equal to zero. In some embodiments, the clock signal provided by the second clock mesh is interrupted in response to zero high bits for all in-flight operations having a value that indicates that the second subsets of the bits of the in-flight instructions are equal to zero.

Figure 3:
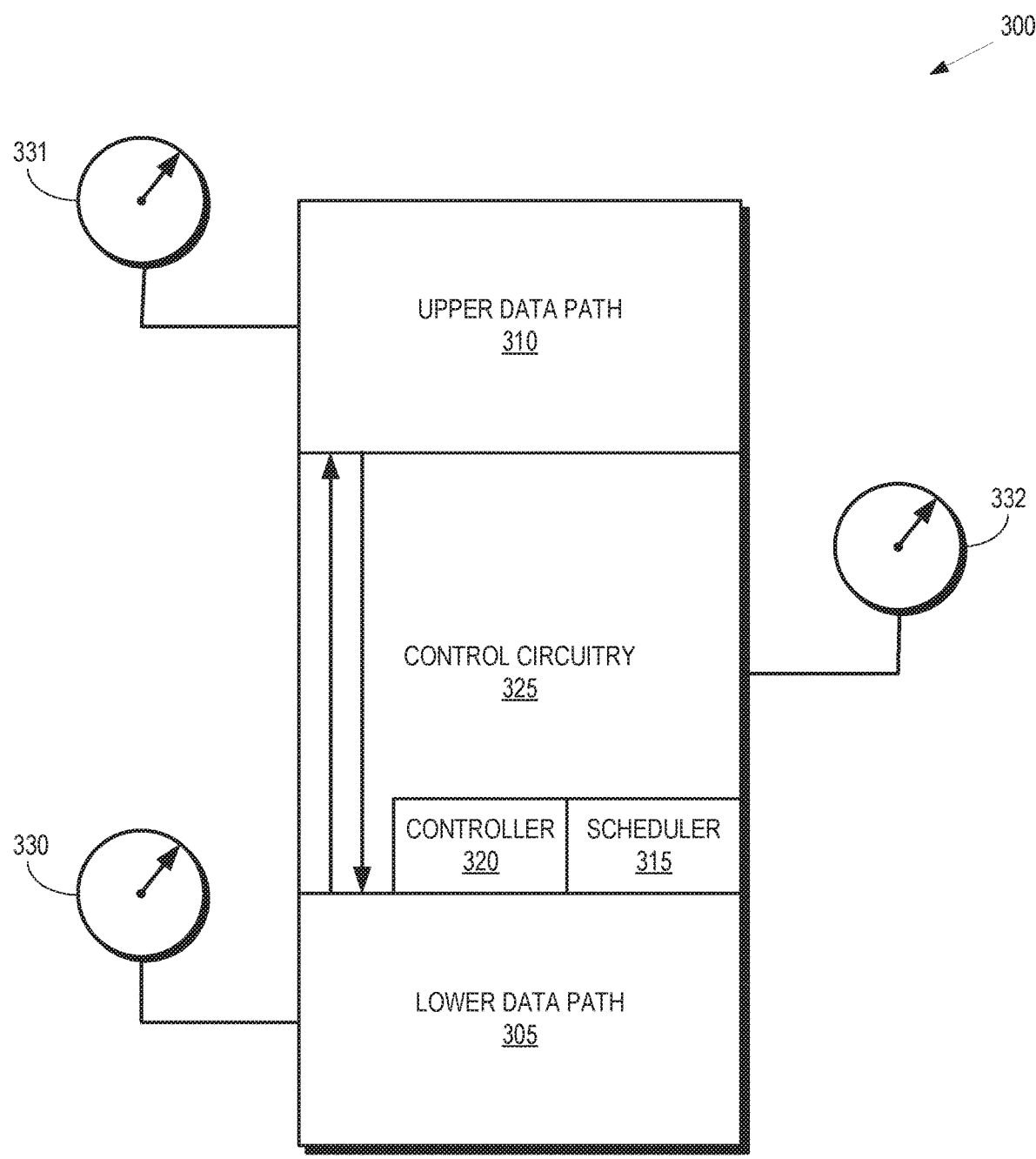
FIG. 3 is a block diagram of a floorplan of a pipeline according to some embodiments.

FIG. 3 is a block diagram of a floorplan of a pipeline 300 according to some embodiments. The pipeline 300 is used to implement some embodiments of the pipelines 251-254 shown in FIG. 2. The pipeline 300 includes a lower data path 305 and an upper data path 310. Some embodiments of the pipeline 300 support 256 bit instructions, in which case the lower data path 305 is configured to process the lower 128 bits of the 256 bit instruction and the upper data path 310 is configured to process the upper 128 bits of the 256 bit instruction. The pipeline 300 also includes a scheduler 315 to schedule instructions for execution in lower data path 305 and the upper data path 310. The pipeline 300 further includes a controller 320 to generate control signals that are provided to the lower data path 305 and the upper data path 310 via control circuitry 325.

In the illustrated embodiment, the lower data path 305 is physically closer to the scheduler 315 and the controller 320. The upper data path 310 is physically further from the scheduler 315 and the controller 320. Consequently, control signaling generated at either the scheduler 315 or the controller 320 takes longer to propagate from the scheduler 315 or the controller 320 to the upper data path 310 than it takes the control signaling to propagate from the scheduler 315 or the controller 320 to the lower data path 305. For example, control signaling generated by the controller 320 is provided to the lower data path 305 via the control circuitry 325 along a path that is physically shorter and requires less propagation time than a path from the controller 320 to the upper data path 310 via the control circuitry 325. The scheduler 315 therefore schedules execution of an upper portion of an instruction by the upper data path 310 one or more cycles after execution of a lower portion of the instruction is scheduled for execution by the lower data path 305. Wider pipelines can also be accommodated by this approach. For example, the scheduler 315 can schedule a first 128 bits of a 512-bit instruction for dispatch during a first cycle, a second 128 bits of the 512-bit instruction for dispatch during a second cycle, a third 128 bits of the 512-bit instruction for dispatch during a third cycle, and a fourth 128 bits of the 512-bit instruction for dispatch during a fourth cycle.

Power is provided to different portions of the pipeline 300 using different clock meshes 330, 331, 332, which are collectively referred to herein as "the clock meshes 330-332." In the illustrated embodiment, a first clock mesh 330 provides power to the lower data path 305, a second clock mesh 331 provides power to the upper data path 310, and a third clock mesh 332 provides power to other portions of the pipeline 300 including the scheduler 315, the controller 320, and the control circuitry 325. As discussed herein, the clock meshes 330-332 are selectively turned on or turned off based on characteristics of that have been dispatched to the pipeline 300 but not yet retired. Some embodiments of the second clock mesh 331 are turned off and do not provide a clock signal to the upper data path 310 in response to determining that there are no in-flight instructions that utilize an upper subset of the bits of the corresponding instructions. Some embodiments of the first clock mesh 330 are turned off and to do not provide a clock signal to the lower data path 305 in response to determining that there are no in-flight instructions in the processor or coprocessor that implements the pipeline 300. The third clock mesh 332 is turned on and provides a clock signal independent of the characteristics of the in-flight instructions.

Figure 4:
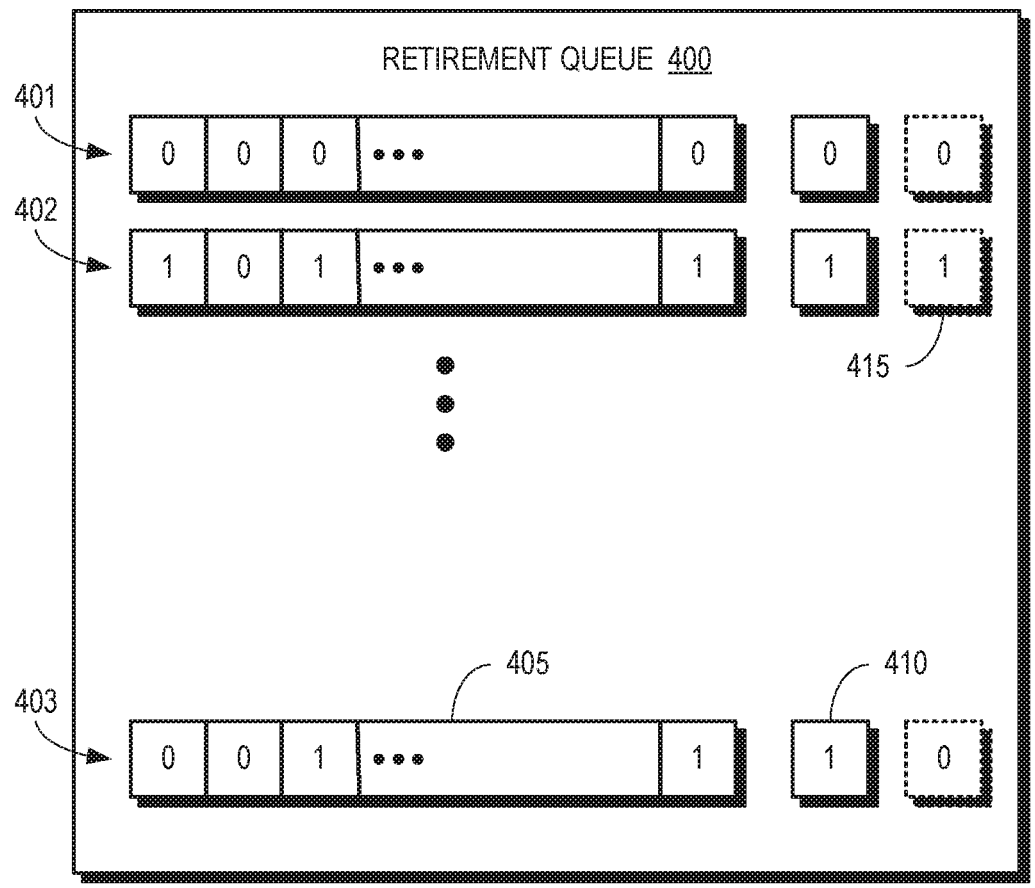
FIG. 4 is a block diagram of a retirement queue that stores information representing in-flight instructions that have not yet been retired according to some embodiments.

FIG. 4 is a block diagram of a retirement queue 400 that stores information representing in-flight instructions that have not yet been retired according to some embodiments. The retirement queue 400 is used to implement some embodiments of the retirement queue 215 shown in FIG. 2. Entries 401, 402, 403 (collectively referred to herein as "the entries 401-403") in the retirement queue 400 are allocated to an instruction in response to the instruction being dispatched for execution in a pipeline, such as one of the pipelines 251-254 shown in FIG. 2. The entries 401-403 are removed from the retirement queue 400 in response to the corresponding instruction being retired, e.g., in response to the results of the instruction being written back to a physical register file such as the physical register file 205 shown in FIG. 2. The instructions associated with the entries 401-403 are therefore in-flight instructions. Some embodiments of the retirement queue 400 are configured to store entries for instructions that are executing in a coprocessor such as the FPU 140 shown in FIG. 1 or the FPU 200 shown in FIG. 2. In some cases, the retirement queue 400 also stores entries for other entities, such as the GPU 115 or the CPU 130 shown in FIG. 1, in which case the entries 401-403 include status information indicating the coprocessor or the other entity that is associated with the instruction.

Each of the entries 401-403 includes a pointer 405 (only one indicated by a reference numeral in the interest of clarity) that stores a value that indicates a corresponding entry in a physical register file, such as the physical register file 205 shown in FIG. 2. The entries 401-403 are also associated with bits 410 (only one indicated by a reference numeral in the interest of clarity) that are set to values that indicate whether the corresponding instruction utilizes all of the available instruction bits or only a subset of the bits. For example, a value of the bit 410 is set equal to zero to indicate that the corresponding instruction is represented by a lower subset and an upper subset of the bits. For another example, the value of the bit 410 is set equal to one to indicate that the corresponding instruction is represented by the lower subset of the bits and the upper subset of the bits is not used to represent the instruction. In that case, the upper subset of the bits can be set equal to zero.

In some embodiments, the entries 401-403 are associated with zero high bits 415 (only one indicated by a reference numeral in the interest of clarity) that are set to values that indicate whether the upper subset of the bits of an instruction are all equal to zero. The zero high bits 415 are optional, as indicated by the dotted lines. The upper subset of the bits of the instruction do not need to be stored in a physical register file if they are all equal to zero. Instead, the value of the zero high bit 415 for the instruction is set to a value (such as one) that indicates that the bits in the upper subset are all equal to zero and are not stored in the physical register file. The value of the zero high bit 415 is used to tell a scheduler (such as the scheduler 230 shown in FIG. 2) whether or not the upper subset of the bits of the corresponding instruction are stored in the physical register file. If the value indicates that the bits in the upper subset are all equal to zero, the scheduler sets the value of these bits equal to zero when the instruction is dispatched so that reading these bits from the physical register file is bypassed. In some embodiments, a clock mesh that provides signals to an upper portion of a pipeline that processes the upper subset of the bits of an instruction is turned off, and the clock signal provided to the upper portion of the pipeline is interrupted, if the zero high bits 415 for all of the in-flight instructions indicated by the entries 401-403 indicate that all the upper subsets of bits of all of the in-flight instructions are equal to zero.

Figure 5:
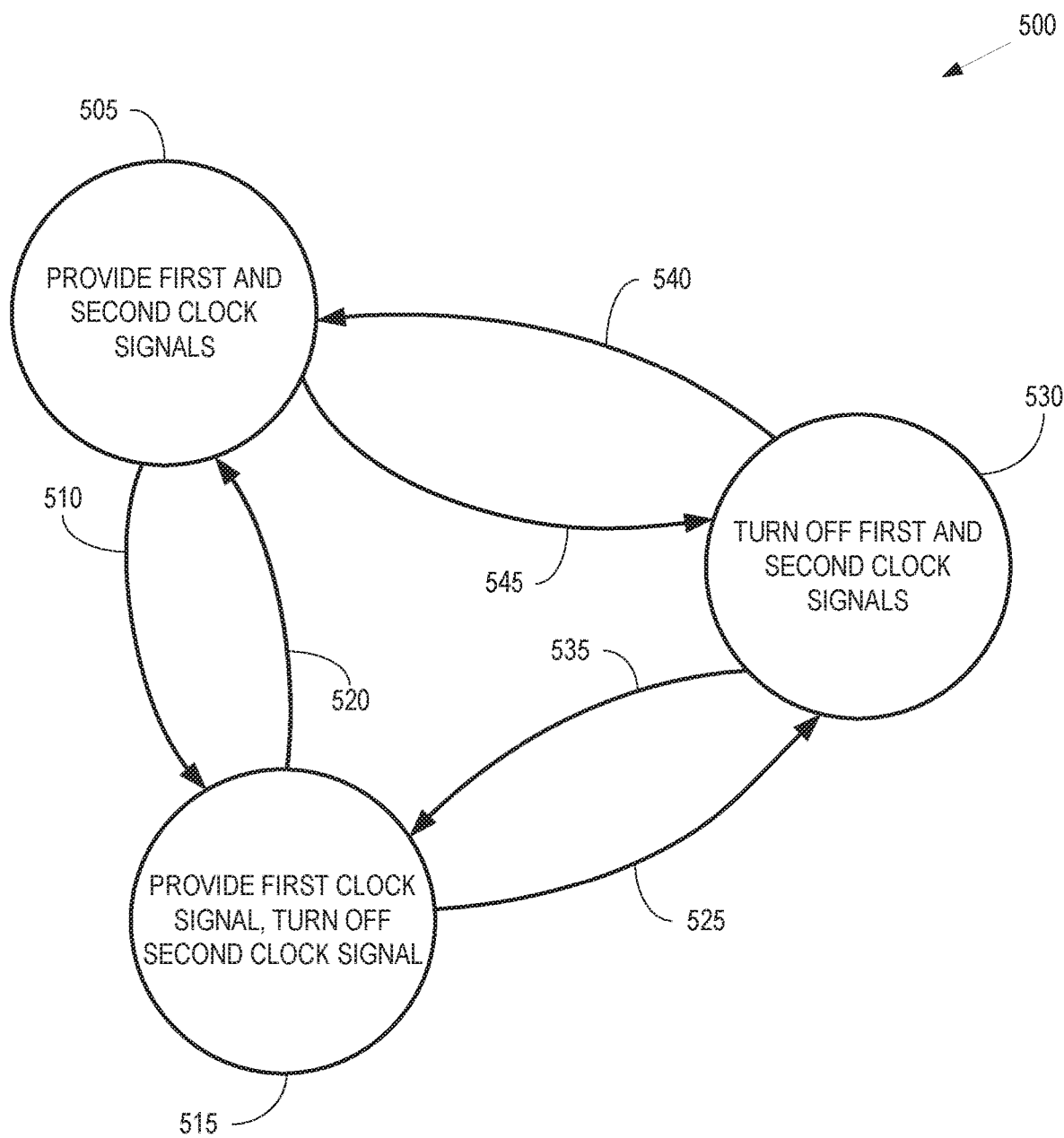
FIG. 5 is a diagram of a state machine that is used to selectively provide clock signals to portions of a pipeline according to some embodiments.

FIG. 5 is a diagram of a state machine 500 that is used to selectively provide clock signals to portions of a pipeline according to some embodiments. The state machine 500 is implemented in some embodiments of the FPU 140 shown in FIG. 1, the FPU 200 shown in FIG. 2, and the pipeline 300 shown in FIG. 3. In the illustrated embodiment, first and second clock meshes are configured to provide first and second clock signals, respectively, to a lower portion and an upper portion, respectively, of the pipeline. The lower portion of the pipeline is configured to process a first subset of bits of an instruction and the upper portion of the pipeline is configured to process a second subset of the bits of the instruction. For example, if the pipeline performs native processing of 256 bit instructions, the lower portion of the pipeline processes the lower 128 bits of the instruction and the upper portion of the pipeline processes the upper 128 bits of the instruction.

At state 505, the first and second clock meshes are providing first and second clock signals to the lower portion and the upper portion of the pipeline. The pipeline is therefore able to process in-flight instructions that utilize the lower and upper subsets of the bits of the in-flight instructions.

The state machine 500 transitions (at arrow 510) from the state 505 to the state 515 in response to determining that no in-flight instructions utilize the upper subsets of the bits of the in-flight instructions. In some embodiments, the absence of in-flight instructions that utilize the upper subsets is determined based on entries in a retirement queue such as the retirement queue 400 shown in FIG. 4. For example, the state machine 500 determines that there are no in-flight instructions that use the upper subsets of the bits if the values of the bits 410 in all of the entries 401-403 indicate that the corresponding instructions do not use the upper subsets of the bits.

At state 515, the first clock mesh provides the first clock signal to the lower portion of the pipeline. The second clock mesh is turned off and the second clock signal is interrupted so that the second clock signal is not provided to the upper portion of the pipeline. Turning off the second clock mesh conserves power that would have been used to provide the second clock signal and operate the upper portion of the pipeline.

The state machine 500 transitions (at arrow 520) from the state 515 to the state 505 in response to determining that at least one in-flight instruction utilizes the upper subsets of the bits of the in-flight instructions.

The state machine 500 transitions (at arrow 525) from the state 515 to the state 530 in response to determining that there are no in-flight instructions. In some embodiments, the absence of in-flight instructions is determined based on entries in a retirement queue such as the retirement queue 400 shown in FIG. 4. For example, the state machine 500 determines that there are no in-flight instructions in response to determining that there are no entries in the retirement queue. Some embodiments of the retirement queue can store in-flight instructions for multiple processors or coprocessors. In that case, the state machine 500 for a coprocessor (such as an FPU) transitions (at arrow 525) from the state 515 to the state 530 in response to determining that there are no in-flight instructions that are to be processed by the coprocessor. The retirement queue may still have in-flight instructions for other processors or coprocessors.

At state 530, the first and second clock meshes are turned off to interrupt the first and second clock signals. Turning off the first and second clock signals saves power that would have been used to provide the first and second clock signals and operate the lower and upper portions of the pipeline.

The state machine 500 transitions (at arrow 535) from the state 530 to the state 515 in response to dispatch of an in-flight instruction that does not utilize the upper subset of bits of the newly dispatched in-flight instruction, e.g., in response to detecting a new entry in the retirement queue for an instruction that does not utilize the upper subset.

The state machine 500 transitions (at arrow 540) from the state 530 to the state 505 in response to dispatch of an in-flight instruction that utilizes both the lower subsets and the upper subsets of bits of the newly dispatched in-flight instruction, e.g., in response to detecting a new entry in the retirement queue for an instruction that utilizes the upper subsets.

The state machine 500 transitions (at arrow 545) from the state 505 to the state 530 in response to retirement of the last in-flight instruction in the retirement queue if the last in-flight instruction utilize both the lower subset and the upper subset of the bits of the instruction. Some embodiments of the retirement queue can store in-flight instructions for multiple processors or coprocessors. In that case, the state machine 500 for a coprocessor (such as an FPU) transitions (at arrow 545) from the state 505 to the state 530 in response to retirement of the last in-flight instruction that was to be processed by the coprocessor. The retirement queue may still have in-flight instructions for other processors or coprocessors.

Figure 6:
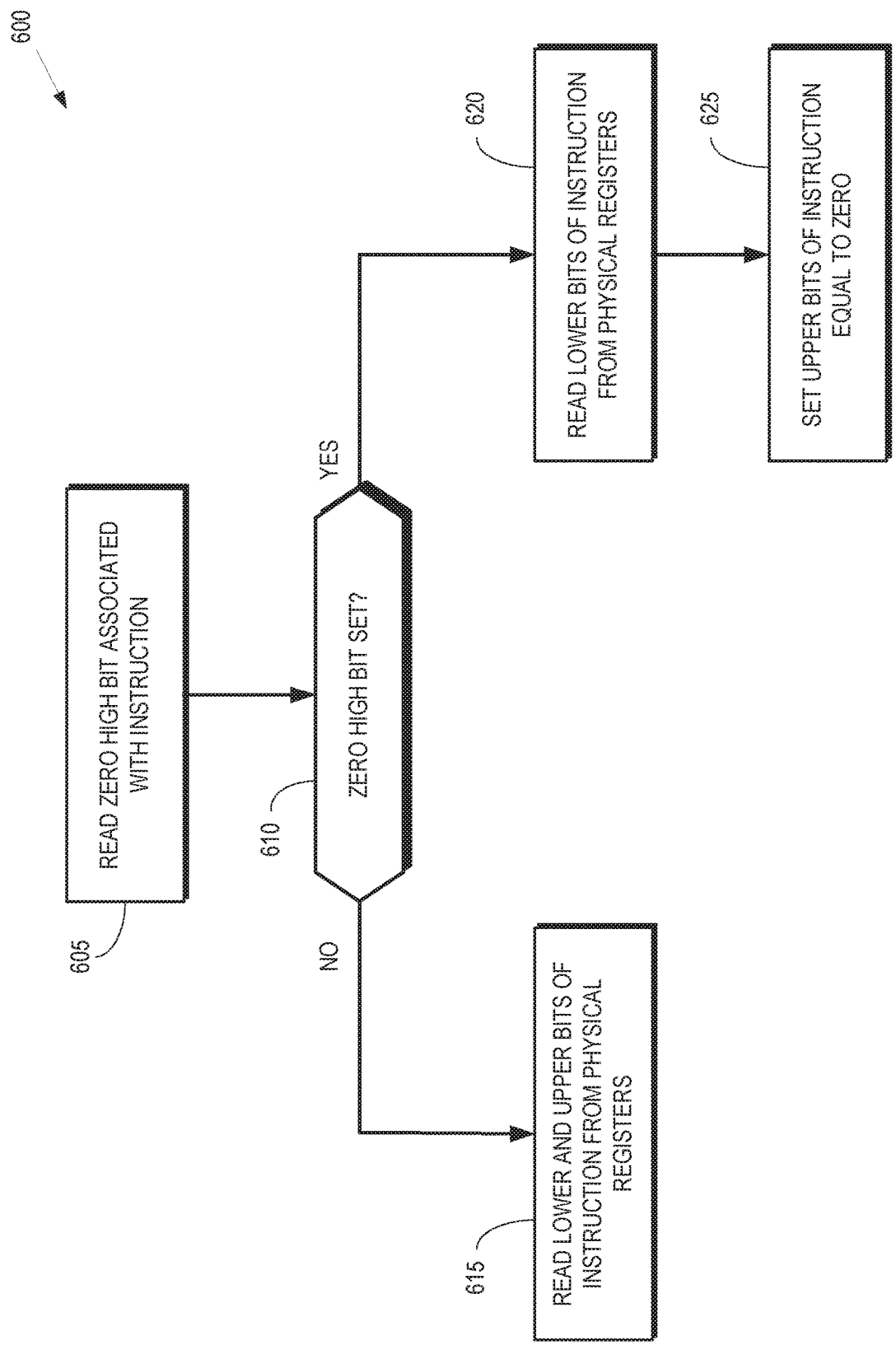
FIG. 6 is a flow diagram of a method of selectively reading bits of an instruction from a physical register file based on a value of the zero high bit associated with the instruction according to some embodiments.

FIG. 6 is a flow diagram of a method 600 of selectively reading bits of an instruction from a physical register file based on a value of the zero high bit associated with the instruction according to some embodiments. The method 600 is implemented in a coprocessor such as some embodiments of the FPU 140 shown in FIG. 1 and the FPU 200 shown in FIG. 2. As discussed herein, the coprocessor is configured to process instructions including a lower subset of bits and an upper subset of bits. The value of the zero high bit indicates whether the upper subset of bits is set equal to zero.

At block 605, a zero high bit associated with an instruction is read or accessed. In some embodiments, the zero high bit is read from a retirement queue entry associated with the instruction.

At decision block 610, the coprocessor determines whether the zero high bit is set, which indicates that the upper subset of bits is equal to zero. In some embodiments, setting the zero high bit to a value of one indicates that the upper subset of bits is equal to zero. If the zero high bit is not set, the method 600 flows to block 615. If the zero high bit is set, the method flows to block 620.

At block 615, the lower subset and the upper subset of bits of the instruction are read from physical registers in the physical register file.

At block 620, only the lower subset of the bits of the instruction are read from physical registers in the physical register file. At block 625, the upper bits of the instruction are set equal to zero. For example, a scheduler can set the values of the upper bits of the instruction to zero in response to the zero high bits being set.

In some embodiments, the apparatus and techniques described above are implemented in a system including one or more integrated circuit (IC) devices (also referred to as integrated circuit packages or microchips), such as the coprocessors described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
   a pipeline comprising a first portion configured to process a first subset of bits of instructions processed by the pipeline and a second portion configured to process a second subset of the bits of the instructions;
   a first clock mesh configured to provide a first clock signal to the first portion of the pipeline;
   a second clock mesh configured to provide a second clock signal to the second portion of the pipeline, wherein the first and second clock meshes selectively provide the first and second clock signals based on a plurality of zero high bits set based on characteristics of respective in-flight instructions that have been dispatched to the pipeline but not yet retired, wherein the characteristics include whether the second subset of the bits are utilized by the respective in-flight instructions;
   a controller configured to provide control signals to the first portion and the second portion of the pipeline; and
   a scheduler configured to provide the first subset of the bits of a first instruction of the instructions to the first portion at a first time and the second subset of the bits of the first instruction to the second portion at a second time subsequent to the first time.

2. The processor of claim 1, wherein the second clock mesh is turned off and does not provide the second clock signal in response to determining that there are no in-flight instructions that utilize the second subset of the bits.

3. The processor of claim 2, further comprising:
   a retirement queue including entries identifying respective in-flight instructions and one zero high bit per entry, and wherein determining that there are no in-flight instructions that utilize the second subset of the bits comprises determining that there are no entries in the retirement queue having a value of the respective zero high bit that indicates that the corresponding instruction utilizes the second subset of the bits.

4. The processor of claim 3, wherein the first clock mesh is turned off and does not provide the first clock signal in response to determining that there are no in-flight instructions in the pipeline.

5. The processor of claim 4, wherein a coprocessor includes the pipeline, and wherein determining that there are no in-flight instructions in the pipeline comprises determining that there are no coprocessor entries in the retirement queue.

6. The processor of claim 3, further comprising:
   a third clock mesh configured to provide a third clock signal to the controller and to the scheduler, wherein a first physical distance traversed by control signals propagating from the controller to the first portion of the pipeline is shorter than a second physical distance traversed by control signals propagating from the controller to the second portion of the pipeline.

7. The processor of claim 6, wherein values of the zero high bits indicate whether the second subset of the bits of the respective in-flight instructions are equal to zero.

8. The processor of claim 7, further comprising:
   a physical register file configured to store values of bits representative of instructions, wherein only the first subset of the bits of a second instruction is stored in the physical register file in response to the value of the respective zero high bit indicating that the second subset of the bits of the second instruction is equal to zero.

9. The processor of claim 8, wherein the scheduler sets the second subset of the bits of the second instruction equal to zero and bypasses reading the second subset of the bits of the second instruction from the physical register file in response to the value of the respective zero high bit indicating that the second subset of the bits of the second instruction are equal to zero.

10. The processor of claim 6, wherein the first subset of the bits is a least significant portion of the instructions, and wherein the second subset of the bits is a most significant portion of the instructions.

11. A method comprising:
    providing, using a first clock mesh, a first clock signal to a first portion of a pipeline that is configured to process a first subset of bits of instructions processed by the pipeline;
    providing, using a second clock mesh, a second clock signal to a second portion of the pipeline that is configured to process a second subset of the bits of the instructions;
    selectively interrupting at least one of the first clock signal and the second clock signal based on characteristics of in-flight instructions that have been dispatched to the pipeline but not yet retired, wherein the characteristics include whether the first subset of the bits or the second subset of the bits of respective in-flight instructions are utilized by the respective in-flight instructions; and
    providing, using a controller, control signals to the first portion and the second portion of the pipeline, wherein a first physical distance traversed by control signals propagating from the controller to the first portion of the pipeline is shorter than a second physical distance traversed by control signals propagating from the controller to the second portion of the pipeline.

12. The method of claim 11, wherein selectively interrupting the at least one of the first clock signal and the second clock signal comprises interrupting the second clock signal in response to determining that there are no in-flight instructions that utilize the second subset of the bits.

13. The method of claim 12, further comprising:
    accessing a retirement queue including entries identifying respective in-flight instructions and one zero high bit per entry indicating whether the corresponding instruction utilizes the second subset of the bits, and
    wherein determining that there are no in-flight instructions that utilize the second subset of the bits comprises determining that there are no entries in the retirement queue having a value of the respective zero high bit that indicates that the corresponding instruction utilizes the second subset of the bits.

14. The method of claim 11, further comprising:
    providing a third clock signal to the controller; and
    providing the third clock signal to a scheduler configured to provide the first subset of the bits of a first instruction of the instructions to the first portion at a first time and the second subset of the bits of the first instruction to the second portion at a second time subsequent to the first time.

15. The method of claim 14, further comprising:

storing only the first subset of the bits of the first instruction in a physical register file, and not storing the second subset of the bits of the first instruction in the physical register file, in response to a value of a respective zero high bit indicating that the second subset of the bits of the first instruction are equal to zero.

16. The method of claim 15, further comprising:

setting the second subset of the bits of the first instruction equal to zero and bypassing reading the second subset of the bits of the first instruction from the physical register file in response to the value of the respective zero high bit indicating that the second subset of the bits of the first instruction are equal to zero.

17. The method of claim 11, further comprising:

determining whether the second subset of the bits are utilized based on whether the second subset of the bits have an identified pattern.

18. A method comprising:

accessing, from a physical register file, an instruction including a first subset of bits and a second subset of bits;

setting a value of a zero high bit of a retirement queue entry corresponding to the instruction to indicate whether the second subset of the bits of the instruction are equal to zero;

accessing the retirement queue entry in response to an indication that the instruction is in-flight;

indicating the value of the zero high bit of the retirement queue entry to a scheduler; and providing, by the scheduler, the first subset of bits to a first portion of a pipeline that is configured to process the first subset of bits at a first time and the second subset of bits to a second portion of the pipeline that is configured to process the second subset of bits at a second time subsequent to the first time based on the value of the zero high bit.

19. The method of claim 18, further comprising:

providing a first clock signal to the first portion of the pipeline; and interrupting a second clock signal to the second portion of the pipeline in response to zero high bits for all in-flight instructions having respective values that indicate that the second subset of the respective bits of the in-flight instructions are equal to zero.

20. The method of claim 18, further comprising:

in response to accessing the instruction, allocating the retirement queue entry to the instruction; and in response to results of the instruction being written to the physical register file, removing data stored in the retirement queue entry.

* * * * *